United States Patent [19]

Nihei

[11] Patent Number: 5,157,767
[45] Date of Patent: Oct. 20, 1992

[54] APPARATUS AND METHOD FOR AUTOMATICALLY OUTPUTTING DOCUMENT HAVING DATA DEPENDENT SIZE

[75] Inventor: Tomoyuki Nihei, Oome, Japan

[73] Assignee: Casio Computer Co., Ltd., Tokyo, Japan

[21] Appl. No.: 471,837

[22] Filed: Jan. 29, 1990

[30] Foreign Application Priority Data

Feb. 23, 1989 [JP] Japan .................................. 1-41763

[51] Int. Cl.⁵ .............................................. G06F 3/14
[52] U.S. Cl. .................................. 395/149; 395/143; 395/148
[58] Field of Search ............... 364/518, 521, 523, 519, 364/200, 900; 395/143, 149, 148, 145

[56] References Cited

U.S. PATENT DOCUMENTS

| 4,495,600 | 1/1985 | Kikuchi et al. | 364/900 |
| 4,807,123 | 2/1989 | Komatsu et al. | 364/200 |
| 4,953,105 | 8/1990 | Hirata et al. | 395/149 |

*Primary Examiner*—Gary V. Harkcom
*Assistant Examiner*—Michael A. Jaffe
*Attorney, Agent, or Firm*—Frishauf, Holtz, Goodman & Woodward

[57] ABSTRACT

An apparatus outputs each item data included in a single record in correspondence with a column position of each item which is set in advance, together with a field framing rule which frames the data. When at least one item data includes a plurality of words, line feed for each word is performed at the corresponding item column position, and the field frame rule is extended in the vertical direction in accordance with the line feed count, and the extended field frame rule is output.

2 Claims, 7 Drawing Sheets

(0011; XXXX; TENNIS,DIVING;
(0012; XXXX; GOLF;
(0013; XXXX;;
(0014; XXXX; SOCCER,SKI,CLIMBING;

| LABEL | X-COORDINATE | Y-COORDINATE | LENGTH | | |
|---|---|---|---|---|---|
| HORIZONTAL RULE | 0 | 0 | 25 | | |
| VERTICAL RULE I | 0 | 0 | | | |
| VERTICAL RULE II | 5 | 0 | | | |
| VERTICAL RULE III | 15 | 0 | | | |
| VERTICAL RULE IV | 25 | 0 | | LABEL NAME | FIELD WIDTH |
| ITEM I | 0 | 0 | | EMPLOYEE NUMBER | 5 |
| ITEM II | 5 | 0 | | NAME | 10 |
| ITEM III | 15 | 0 | | HOBBY | 10 |
| | | | | | |

FIG. 3

| 0 | 5 | 15 | 25 |
|---|---|---|---|
| 0011 | XXXX | TENNIS DIVING | |
| 0012 | XXXX | GOLF | |
| 0013 | XXXX | | |
| 0014 | XXXX | SOCCER SKI CLIMBING | |

FIG. 4

| 0 | 5 | 15 | 25 |
|---|---|---|---|
| 0011 | XXXX | TENNIS,DIVING | |
| 0012 | XXXX | GOLF | |
| 0013 | XXXX | | |
| 0014 | XXXX | SOCCER,SKI, CLIMBING | |

FIG. 7

APPARATUS AND METHOD FOR AUTOMATICALLY OUTPUTTING DOCUMENT HAVING DATA DEPENDENT SIZE

BACKGROUND OF THE INVENTION

1. Field of the Invention

The present invention relates to an apparatus and a method for outputting a plurality of records in accordance with a document format which is designated in advance.

2. Description of the Related Art

In a conventional office computer and the like, when a word in each data item in each record is printed in accordance with a document format, the document format is fixed in consideration of, e.g., the number of data items in the record, the word length of a word corresponding to each data item, and the number of words, and a word and a field framing line are output in accordance with the document format.

The size of a document form is, however, limited in advance, or fixed to be a predetermined one. Therefore, when the document format is set, the length of each data item in the layout direction must be limited.

When a large number of words are recorded in association with a single data item in one record, therefore, a word which is not completely printed, or a word which is not printed at all may often be present.

SUMMARY OF THE INVENTION

It is an object of the present invention to provide an apparatus and a method for outputting a plurality of words in correspondence with a data item on a document even if one data item in one record includes a plurality of words.

In order to achieve the above object, according to the present invention, there is provided a document output apparatus comprising: record memory means for storing a plurality of records each comprising a plurality of item data; column field memory means for storing a plurality of column field data representing column field on a recording medium in correspondence with each item; line position memory means for storing line position data representing a line on said recording medium; data output means, connected to said record memory means, said column field memory means, and said line position memory means, for outputting each item data included in a read record at a column field of a line determined by the field data corresponding to the item and the line position data on said recording medium upon read-out of each record stored in said record memory means, and for performing line feed for each word at the column field corresponding to the item to output the data when the item data for the item includes a plurality of words; field framing rule output means, connected to said column field memory means, said line position memory means, and said data output means, for forming field framing rule which frame each item data of the read record on the basis of a maximum line feed count of the word which is line-fed by said data output means, and outputting the field framing rules from the line determined by the line position data on said recording medium; and means, connected to said line position memory means and said data output means, for updating the line position data in accordance with the maximum line feed count of the word.

According to the present invention, therefore, all words included in each record can be output in correspondence with the item data on the document. In addition, since a field framing rule of the document which frames the item data is output to have a size corresponding to an amount of words, a document including a field framing rule having a size corresponding to the amount of data of all records can be output.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 3 is a view showing the contents of a layout format memory 4;

FIG. 4 is a view showing an example of an output of the first document;

FIG. 7 is a view showing an example of an output of the second document; and

DETAILED DESCRIPTION OF THE PREFERRED EMBODIMENTS

Figures 1, 2:
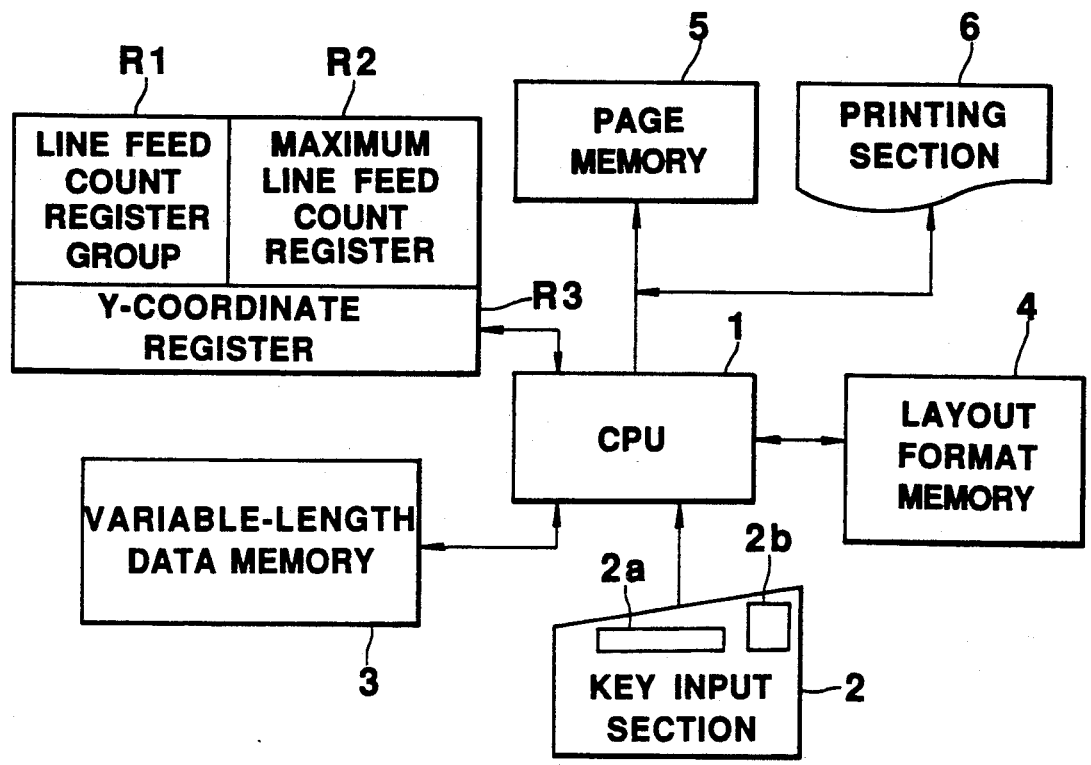
FIG. 1 is a block diagram of a document output apparatus.
FIG. 2 is a view showing the contents of a record stored in a variable-length data memory 3.

FIG. 1 is a block diagram of a document output apparatus according to an embodiment to which the present invention is applied.

In this document output apparatus, data input from a key input section 2 is stored in a variable-length data memory 3 in accordance with a variable-length data format under the control of a CPU 1. The stored data is transferred to a page memory 5 in units of pages in accordance with layout format data in a layout format memory 4, and the transferred data is printed in a printing section 6 in units of pages.

The key input section 2 includes various function keys such as a document create key 2b for designating creation of a document format of the data in the variable-length data memory 3 in accordance with the layout format data in the layout format memory 4, in addition to a data input key 2a for inputting various data.

FIG. 2 schematically illustrates the contents of the variable-length data memory 3 in units of records. Note that ";" in FIG. 2 is an end code of each data item; and ",", a separation code for separating a plurality of words in a single data item. In FIG. 2, each record consists of three items. In the third data items, two, one, zero, and three words are recorded in the order named from the first record.

FIG. 3 illustrates the format data of the layout format memory 4, and shows data which allows document output of the contents in FIG. 2 in accordance with a printing sheet shown in FIG. 4 or 7.

More specifically, "0" is set as each of X- and Y-coordinates of a starting point of a horizontal rule on the printing sheet, and "25" is set as its length. The X-coordinate and the length represent X-coordinate field of the document.

As shown in FIG. 4 or 7, since the document includes three column field and four vertical rules are required, (0, 0), (5, 0), (15, 0), and (25, 0) are set as X- and Y-coordinates of the starting points of the four vertical rules I to IV on the printing sheet, respectively.

In addition, (0, 0), (5, 0), and (15, 0) are set as starting position coordinates of the column field of three data items on the printing sheet, respectively. The data items correspond to the label names "employee number", "name", and "hobby", respectively. A field width of each column field is also set.

The CPU 1 arranges variable-length item data in FIG. 2 in a document format in accordance with the contents of the layout format memory 4. At this time, line feed is performed to sequentially extend the formats. If one item data includes two words, e.g., the words corresponding to the third item in the first record in FIG. 2, these two words are printed while performing line feed for each word. An output line positions in the Y-direction (vertical direction) of horizontal rules on the printing sheet are sequentially updated in accordance with a line feed count. In addition, the length of each vertical rule corresponding to the record is also determined in accordance with the line feed count.

Note that when the above document output is performed, the CPU 1 utilizes a register group R1, and registers R2 and R3.

An operation of this embodiment will be described hereinafter with reference to FIG. 5, and FIGS. 6A to 6I.

Figure 5:
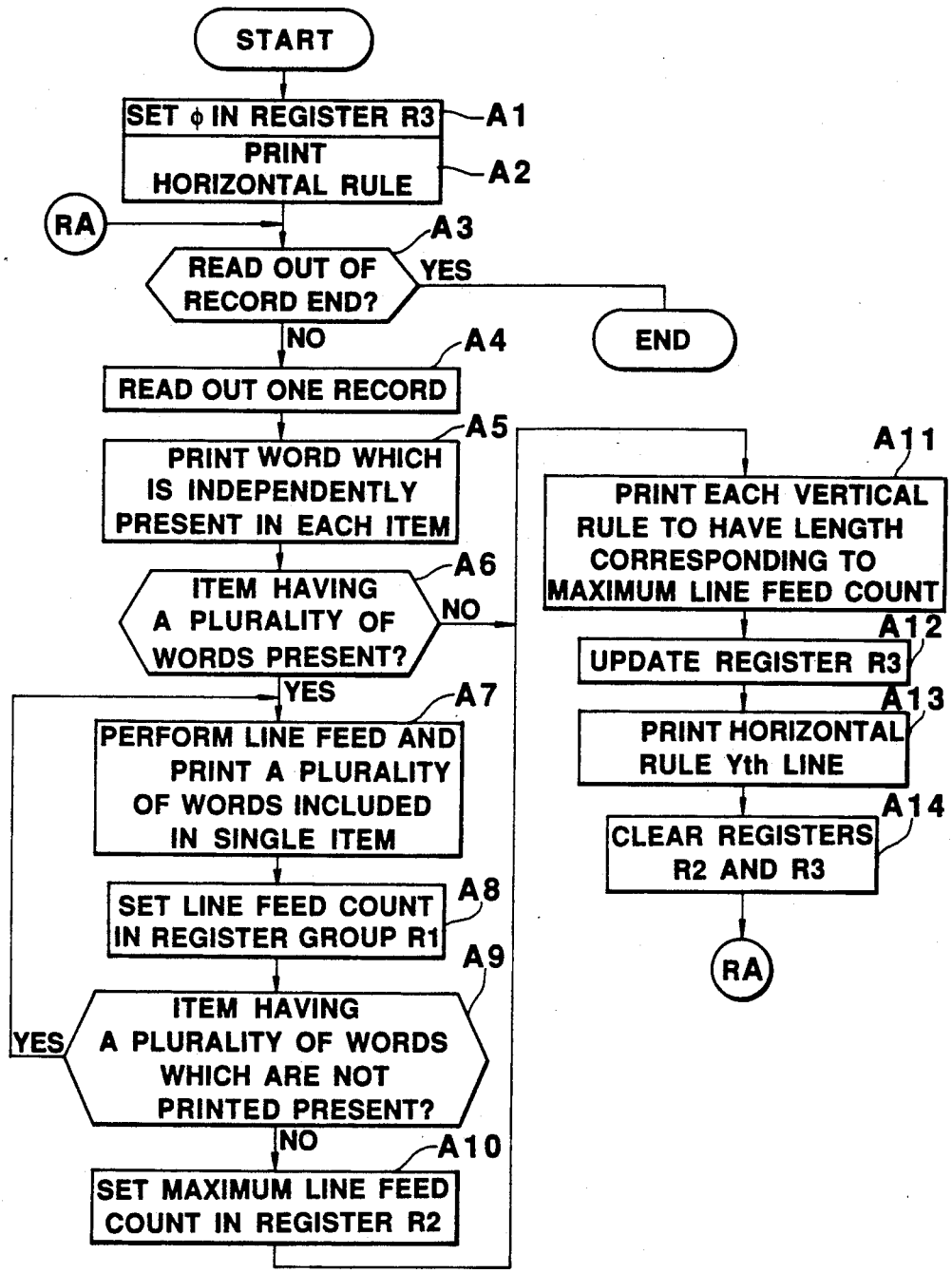
FIG. 5 is a flow chart showing the contents of the first processing in a CPU 1.
Figure 6A:
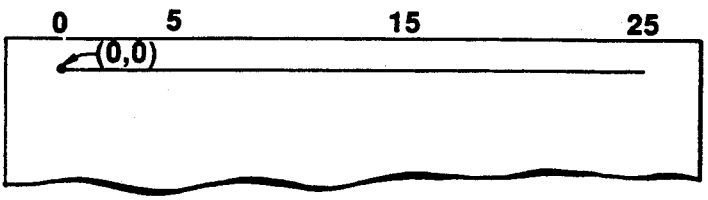
FIGS. 6A to 6I are views for explaining a procedure of a layout output of a record and lines.

When the document create key 2b is operated in the key input section 2, the CPU 1 sets "0" as an initial value of Y-coordinate data in the register R3, and a horizontal rule having a length of "25" is printed from a position represented by the Y-coordinate initial value "0" and X-coordinate data "0" of the horizontal rule in the layout format memory 4 (steps A1 and A2 in FIG. 5, and FIG. 6A).

Figure 6B:
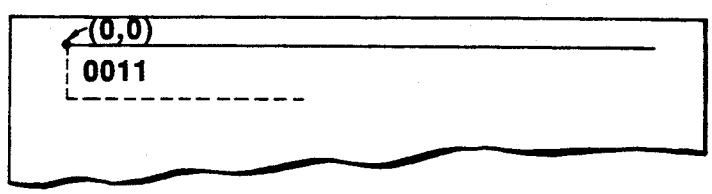
Figure 6C:
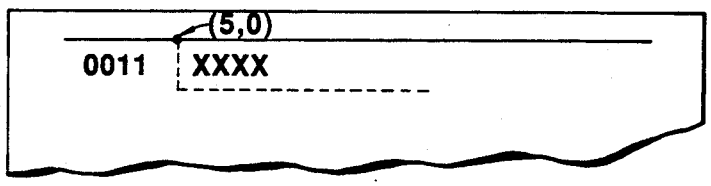

Then, it is checked whether a read out operation of the contents of all the records in the variable-length data memory 3 is ended (step A3). If NO in step A3, the contents of one record are read out from the variable-length data memory 3 (step A4). As shown in FIGS. 6B and 6C, all the items each including one word in the record are printed in the horizontal direction from a position represented by X-coordinate data corresponding to each item in the layout format memory 4 and current Y-coordinate data in the register R3 (step A5).

Figure 6D:
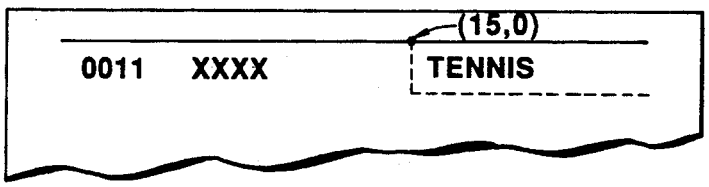
Figure 6E:
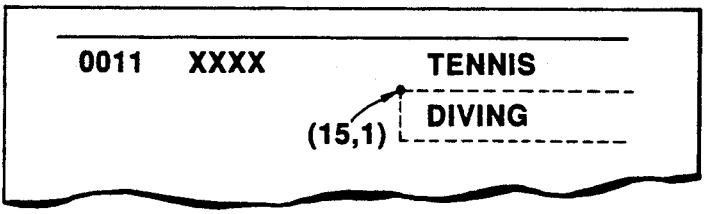

Then, it is checked whether an item including a plurality of words is present in the record (step A6). As a result, if YES in step A6, these plurality of words are printed as follows. More specifically, as shown in FIG. 6D, the first word is printed in the horizontal direction from a position represented by X-coordinate data corresponding to the item in the layout format memory 4, and current Y-coordinate data in the register R3. As shown in FIG. 6E, the other word included in the same item is printed while line feed is performed to align leading characters of the words at the position of the X-coordinate data (step A7). Then, the data of the line feed count is set in one register in the register group R1 (step A8). It is checked whether an item having a plurality of words which are not output is left (step A9). If YES in step A9, the flow returns to step A7 in order to print the left word in the same manner as in the above operation.

On the other hand, when layout of the words of all the items each having a plurality of words is ended, the maximum line feed count data in the register group R1 is set in the register R2 (step A10).

Figure 6F:
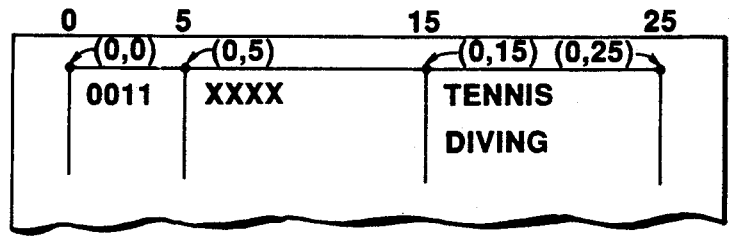

As shown in FIG. 6F, each vertical rule having a length corresponding to the maximum line feed count data in the register R2 is printed from a position represented by the corresponding X-coordinate data in the layout format memory 4 and the current Y-coordinate data in the register R3 (step A11).

Figure 6G:
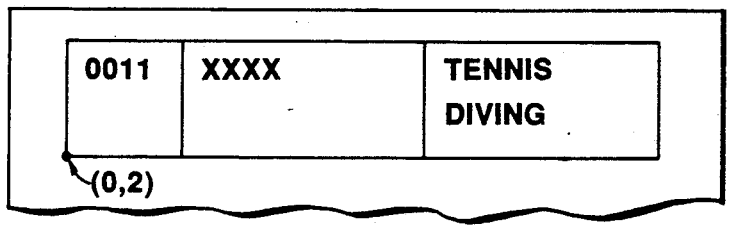

Then, the Y-coordinate data in the register R3 is updated in accordance with the maximum line feed count data in the register R2 (step A12), and a horizontal rule having a length of "25" is printed from a position represented by the updated Y-coordinate data in the register R3 and the X-coordinate data "0" of the horizontal rule in the layout format memory 4 (step A13 in FIG. 5, and FIG. 6G).

Figure 6H:
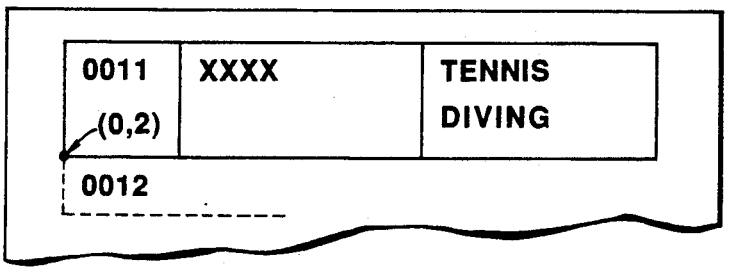
Figure 6I:
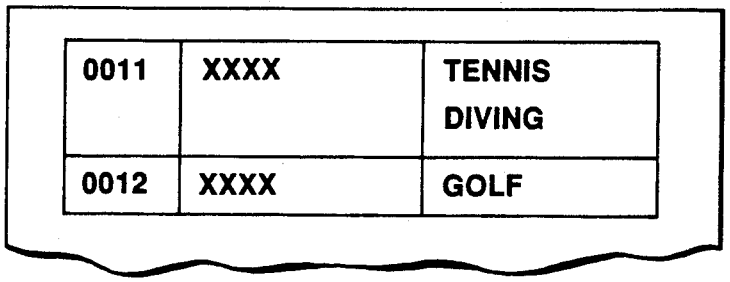

Each line feed count data in the register group R1 and the maximum line feed count data in the register R2 are cleared to prepare for document output of the next record which is to be performed in the same manner as in the above operation (step A14), and the flow returns to step A3. As a result, as shown in FIGS. 6H and 6I, the document is sequentially extended.

Note that, when it is determined that an item having a plurality of words is not present in step A6, the flow advances step A11.

Thus, a field framing rules which frame each item data of the record are sequentially printed in accordance with the number of records in the variable-length data memory. At this time, when an item data on the record includes a plurality of words, the words are output while performing line feed for each word. The position of the horizontal rule in the vertical direction is shifted in accordance with the line feed count.

FIG. 7 is a view showing an example of a printing sheet of the second document.

In the example of the first document shown in FIG. 4, when one data item includes a plurality of words, the words are printed while performing line feed for each word. In contrast to this, in the document in FIG. 7, words are sequentially printed within a column field corresponding to the item. When all the words cannot be included within the column field, characters which cannot be included is printed to the same column field in the next line.

Figure 8:
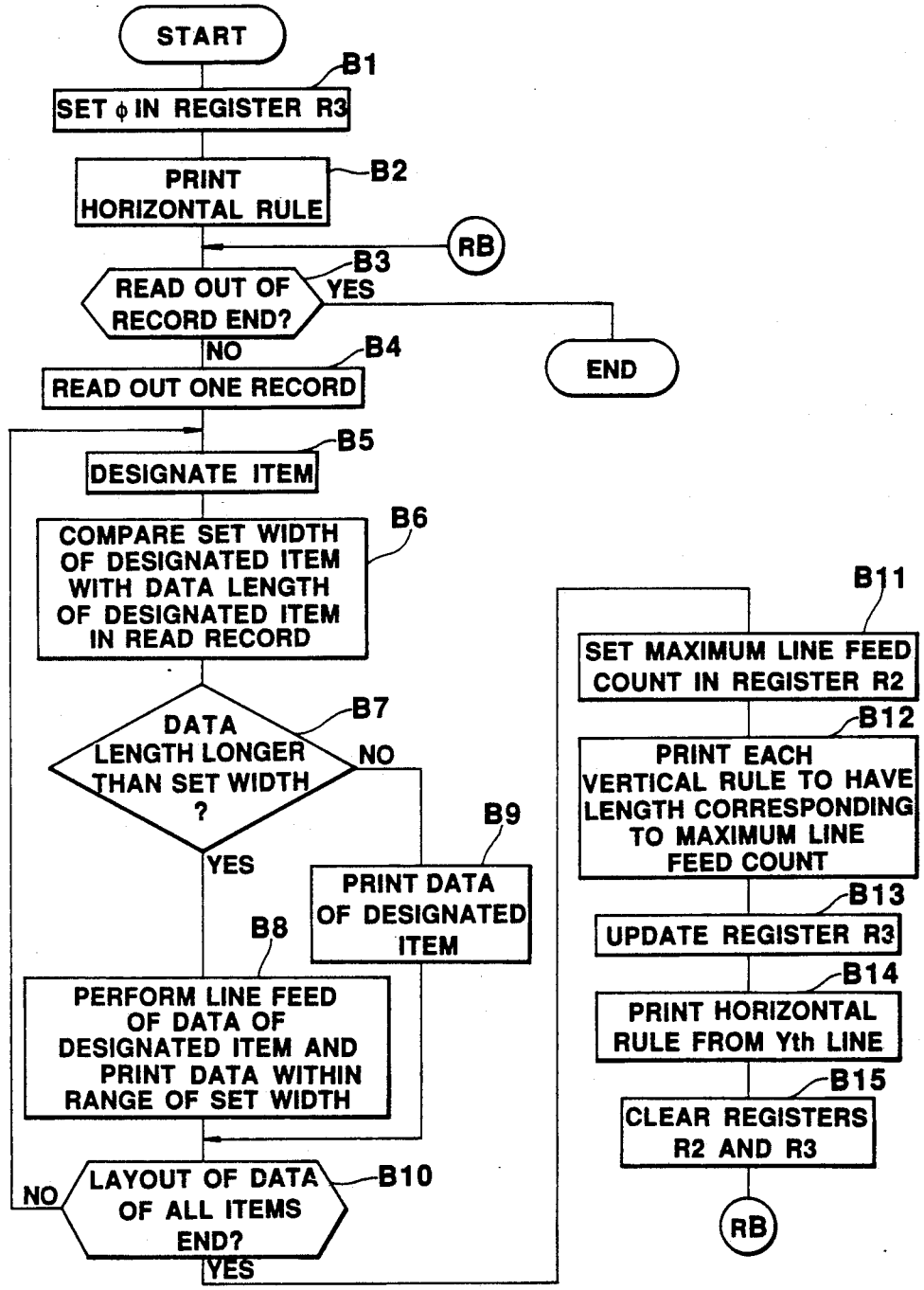
FIG. 8 is a flow chart showing the contents of the second processing in the CPU 1.

FIG. 8 is a flow chart showing the contents of the second processing in the CPU 1 in order to print the above-mentioned second document. The flow chart in FIG. 8 will be described below in contrast to the contents of the first processing in FIG. 5.

In FIG. 8, steps B1 to B4 are the same as steps A1 to A4 in FIG. 5, and steps B11 to B15 in FIG. 8 are the same as steps A10 to A14 in FIG. 5.

Steps B5 to B10 in FIG. 8 will be described hereinafter.

Items in the record are sequentially designated from the first item, and a field width which is set for the designated item is read out from the layout format memory 4. The read field width is compared with a data length of the designated item in the read record. When the data length of the designated item in the read record is longer than the set width, line feed is performed and the data is printed from the line represented by the Y-coordinate in the register R3 within a range of the set width. When the data length of the item in the read record is shorter than the set width, the data is arranged at the line represented by the Y-coordinate in the register R3 within a range of the set width. A series of processing in steps B5 to B9 are sequentially repeated and executed for all the items in the record. When the data layout for all the items is ended, the flow advances to step B11.

Additional advantages and modifications will readily occur to those skilled in the art. Therefore, the invention in its broader aspects is not limited to the specific details, representative devices, and illustrated examples shown and described. Accordingly, departures may be made from such details without departing from the spirit or scope of the general inventive concept as defined by the appended claims and their equivalents.

What is claimed is:

1. A document output apparatus comprising:
    (a) record memory means for storing a plurality of records, each record comprising a plurality of item data;
    (b) layout format memory means for storing data of column fields on a printing sheet in correspondence with each item data, data of X-coordinates on the printing sheet dividing each of the column fields;
    (c) Y-register means for storing data of a Y-coordinate on the printing sheet;
    (d) means for comparing, upon read-out of each record stored in said record memory means, a length of each item data in the read record with a length of a corresponding column field;
    (e) means for printing, on the printing sheet, the each item data at a printing position represented by the corresponding column field data in the layout format memory means and the Y-coordinate data in the Y-register means when the length of a the item data is shorter than the length of corresponding column field, and for printing the item data on a plurality of lines within the corresponding column field from a printing line position represented by the Y-coordinate data in the Y-register means when the length of the item data is longer than the length of corresponding column field;
    (f) counter means for storing data of a maximum line feed count of all the item data in the read record;
    (g) means for printing, on the printing sheet, each vertical rule having a length corresponding to the data in the counter means at a position represented by the corresponding X-coordinate data in the layout format memory means and the Y-coordinate data in the Y-register means; and
    (h) means for storing, on the printing sheet, a horizontal rule at an area represented by the X-coordinate field data in the layout format memory means and a Y-coordinate data updating the Y-coordinate data in the Y-register means in accordance with the maximum line feed count data in the counter means.

2. A method of outputting a document in an apparatus comprising data memory means for storing a plurality of records, each record comprising a plurality of variable-length item data, the method comprising the steps of:
    (a) reading out each record from said memory means;
    (b) comparing a length of each item data in the read record with a length of a column field which is designated in advance corresponding to each item data;
    (c) printing, on a printing sheet, the item data at a printing position represented by the column field and Y-coordinate data in a Y-register when the length of the item data is shorter than the length of a corresponding column field;
    (d) printing, on the printing sheet, the item data on a plurality of lines within the corresponding column field from a printing line position represented by the Y-coordinate data in the Y-register when the length of the item data is longer than the length of a corresponding column field;
    (e) setting, in a maximum line feed counter, data of a maximum line feed count of all the item data in the read record;
    (f) printing each vertical rule having a length corresponding to the data set in the maximum line feed counter at a position represented by corresponding X-coordinate data in a layout format memory and the y-coordinate data in the Y-register;
    (g) updating the Y-coordinate data in the Y-register in accordance with the data set in the maximum line feed counter;
    (h) printing a horizontal rule at an area represented by X-coordinate field data in the layout format memory and the updated Y-coordinated data in the Y-register; and
    (i) repeating the above steps for all the records stored in the data memory means.

* * * * *